(12) United States Patent
Nachtmann

(10) Patent No.: US 10,876,632 B2
(45) Date of Patent: Dec. 29, 2020

(54) RING SEAL

(71) Applicant: W. L. Gore & Associates GmbH, Putzbrunn (DE)

(72) Inventor: Anton Nachtmann, Miesbach (DE)

(73) Assignee: W. L. Gore & Associates GmbH, Putzbrunn (DE)

(*) Notice: Subject to any disclaimer, the term of this patent is extended or adjusted under 35 U.S.C. 154(b) by 221 days.

(21) Appl. No.: 15/742,342

(22) PCT Filed: Jul. 4, 2016

(86) PCT No.: PCT/EP2016/065708
§ 371 (c)(1),
(2) Date: Jan. 5, 2018

(87) PCT Pub. No.: WO2017/005692
PCT Pub. Date: Jan. 12, 2017

(65) Prior Publication Data
US 2018/0209543 A1   Jul. 26, 2018

(30) Foreign Application Priority Data

Jul. 7, 2015 (DE) .......................... 10 2015 110 944

(51) Int. Cl.
*F16J 15/02* (2006.01)
*F16J 15/10* (2006.01)
(52) U.S. Cl.
CPC ........... *F16J 15/022* (2013.01); *F16J 15/102* (2013.01); *F16J 15/104* (2013.01)
(58) Field of Classification Search
CPC ......... F16J 15/102; F16J 15/022; F16J 15/104

USPC ................................................ 277/650, 652
See application file for complete search history.

(56) References Cited

U.S. PATENT DOCUMENTS

| 230,220 A * | 7/1880 | Bailey ............... F16J 15/104 428/66.4 |
| 2,717,025 A * | 9/1955 | Jelinek ............... F16J 15/108 264/126 |
| 2,859,061 A * | 11/1958 | Reid .................. F16J 15/328 277/434 |

(Continued)

FOREIGN PATENT DOCUMENTS

| CN | 1770973 A | 5/2006 |
| DE | 102011077015 A1 | 12/2012 |

(Continued)

OTHER PUBLICATIONS

International Search Report and Written Opinion issued in PCT/EP2016/065708 dated Sep. 6, 2016 (7 pages).

(Continued)

*Primary Examiner* — Kristina R Fulton
*Assistant Examiner* — L. Susmitha Koneru
(74) *Attorney, Agent, or Firm* — Greenberg Traurig, LLP

(57) ABSTRACT

An O-ring seal consists of an elastomeric core (1) and a sheathing enclosing the core, said sheathing consisting preferably of two shell-like, thermoplastically coated PTFE films (3, 4). In the overlapping region (3a, 3b, 4a, 4b) of the films, the latter are connected together in a sealing manner, in that the thermoplastic coatings thereof are welded together by the laser transmission welding method. The sheathing is not connected to the elastomeric core (2).

21 Claims, 3 Drawing Sheets

(56) References Cited

U.S. PATENT DOCUMENTS

Figure 1:
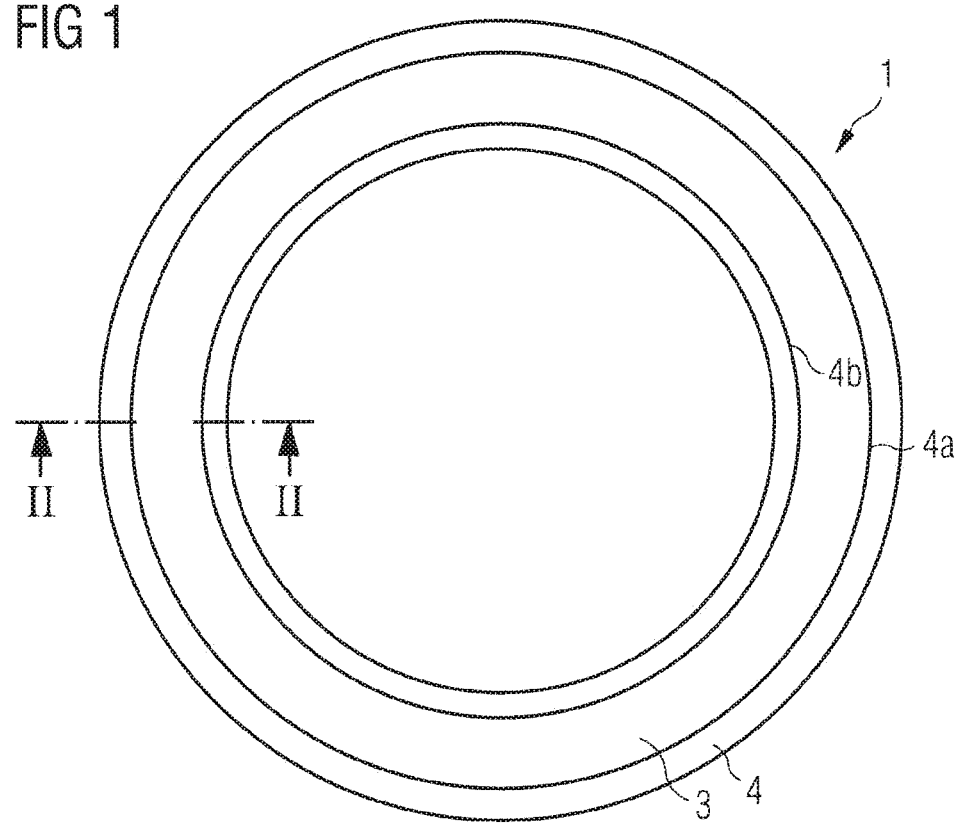

| | | | | |
|---|---|---|---|---|
| 2,868,575 | A * | 1/1959 | Hawxhurst | F16J 15/104 277/652 |
| 3,549,156 | A * | 12/1970 | Van Vleet | F16J 15/328 277/652 |
| 4,330,136 | A * | 5/1982 | Henson | B63B 19/26 277/652 |
| 4,442,174 | A * | 4/1984 | Neumann | B29C 44/22 428/376 |
| 4,558,875 | A * | 12/1985 | Yamaji | C09K 3/10 106/DIG. 4 |
| 5,045,635 | A * | 9/1991 | Kaplo | H02B 1/16 174/354 |
| 5,160,773 | A * | 11/1992 | Sassa | B32B 27/06 428/76 |
| 5,202,536 | A * | 4/1993 | Buonanno | H05K 9/0015 174/356 |
| 5,217,797 | A * | 6/1993 | Knox | B29C 70/086 428/167 |
| 5,374,473 | A * | 12/1994 | Knox | B29C 43/18 428/218 |
| 5,646,369 | A * | 7/1997 | Miska | G06F 13/409 174/356 |
| 6,114,004 | A * | 9/2000 | Cydzik | B60R 13/02 277/644 |
| 6,303,854 | B1 * | 10/2001 | Papaleo | H05K 9/0015 174/382 |
| 6,485,809 | B1 * | 11/2002 | Minor | F16J 15/102 277/407 |
| 6,653,556 | B2 * | 11/2003 | Kim | H05K 9/0015 174/358 |
| 7,528,602 | B2 * | 5/2009 | Seki | A61B 5/04005 324/318 |
| 8,146,924 | B2 * | 4/2012 | Ohmi | F16J 15/0887 277/647 |
| 2003/0052458 | A1 * | 3/2003 | Zafar | F16F 9/3278 277/534 |
| 2004/0032092 | A1 * | 2/2004 | Potter | F16J 15/061 277/608 |
| 2005/0151326 | A1 * | 7/2005 | Wade | F02F 11/002 277/592 |
| 2005/0230971 | A1 * | 10/2005 | Sakazaki | F16L 33/01 285/252 |
| 2006/0080825 | A1 * | 4/2006 | Pille | H05K 5/0243 174/381 |
| 2007/0045967 | A1 * | 3/2007 | Park | F16J 15/104 277/534 |
| 2010/0163219 | A1 * | 7/2010 | Gibson, Jr. | F16C 33/20 165/185 |
| 2010/0276895 | A1 * | 11/2010 | Taylor | F16J 15/062 277/608 |
| 2014/0090343 | A1 * | 4/2014 | Egloff | B32B 15/02 55/487 |
| 2015/0014945 | A1 * | 1/2015 | Heise | F16J 15/125 277/637 |
| 2015/0267814 | A1 * | 9/2015 | Yoshida | C09K 3/1009 277/626 |

FOREIGN PATENT DOCUMENTS

| | | | | |
|---|---|---|---|---|
| EP | 0303102 A2 | 2/1989 | | |
| GB | 2 264 986 A | 9/1993 | | |
| JP | S52108476 U | 8/1977 | | |
| WO | WO 2005/105434 A2 | 11/2005 | | |
| WO | WO-2009002231 A2 * | 12/2008 | | F16J 15/102 |

OTHER PUBLICATIONS

English translation of International Preliminary Report on Patentability issued for Application No. PCT/EP2016/065708 dated Jan. 18, 2018.

* cited by examiner

RING SEAL

This application is a U.S. National Stage of International Application No. PCT/EP2016/065708, filed on Jul. 4, 2016, which claims priority from German Application No. DE102015110944.1, filed on Jul. 7, 2015, the entire contents of which are incorporated herein by reference.

The invention relates to a ring seal, in particular an O-ring seal, having a sheathing surrounding an annular elastomeric core.

There are numerous applications for O-rings in which the use of conventional elastomers is not possible. Aggressive chemicals or extreme temperatures can destroy conventional O-rings and result in failure or leaks. In the case of such stresses, the elastomeric O-rings are also sheathed with polytetrafluoroethylene (PTFE) or manufactured entirely from PTFE, which is resistant to chemicals and heat. PTFE O-rings are, however, harder than elastomeric O-rings and not elastic. Accordingly, they do not spring back and as a result require greater contact pressures, it being possible to counteract this to a certain extent by slit ring embodiments. Alternatively, it is also possible to use perfluoroelastomer (FFKM), which combines the positive properties of PTFE with the elastic behavior of fluorinated rubber (FKM). However, the price of perfluoroelastomers is comparatively high, and so O-rings made entirely of perfluoroelastomers are only used when other materials no longer meet the requirements and safety-related aspects justify the higher costs. Typical fields of use of perfluoroelastomers are for example the chemical, petroleum and semiconductor industry, high vacuum technology and aerospace (catalog "O-Ringe" [O-rings] from Dichtomatik, edition 3.6.3).

O-rings, the elastic core of which is sheathed with FEP or PFA, are another alternative to the comparatively nonelastic PTFE sealing rings. FEP is the short name for tetrafluoroethylene-hexafluoropropylene and has similar properties to PTFE, in particular high chemical resistance and good friction behavior. In contrast to PTFE, FEP is thermoplastically deformable. PFA is the abbreviation for perfluoroalkoxy alkane, which likewise has very similar properties to PTFE. It can likewise be thermoplastically processed. Suitable materials for the annular core are generally fluorinated rubber (FKM), silicone rubber (VMQ), ethylene-propylene-diene rubber or other conventional elastomers. The FEB- or PFA-sheathing of the core is created seamlessly in an injection-molding process, i.e. the elastomeric inner ring is introduced as an insert into an injection mold and them encapsulated with FEB or PFA. Typical fields of use of FEP- or PFA-sheathed O-rings are the chemical industry, petrochemistry, medical technology, the foodstuffs industry, water and wastewater technology and similar industrial fields, for example for sealing off valve stems or as a secondary sealing element for mechanical seals. They are used predominantly as static seals or as sealing elements for slow switching and rotary movements (catalog "O-Ringe and Stützringe" [O-rings and support rings] from Trelleborg Sealing Solutions, April 2012 edition).

As an alternative thereto, there are PTFE-sheathed O-rings, which are available either with a PTFE coating, which is produced from a compound of dissolved PTFE, or with a PTFE wrapping, which is usually produced from a peel film. PTFE-coated O-rings have the disadvantage that the jacket is rapidly abraded, and thus the sheathing does not provide sufficient protection against aggressive chemicals. On the other hand, PTFE-wrapped O-rings have the disadvantage that the structure of the wrap allows the penetration of chemicals because the PTFE wrap is formed as an open sheathing either with a butt joint or with mutually overlapping peripheral regions. In use, the butt joint or the overlapping end is therefore either arranged on the side located opposite the medium to be separated or oriented at least counter to the direction of attack of the medium. In contrast to FEP and PFA, PTFE is not a thermoplastic material but a sintered powder from which it is not possible to manufacture a tube material because the temperatures during the production process would be so high that they would destroy the elastomeric material of the O-ring core, and so a seamless sheathing is not possible with PTFE, unlike with FEP and PFA (catalog "FEP/PFA-ummantelte O-Ringe/Technologie.Anwendung.Produkte" [FEP/PFA-sheathed O-rings/Technology.Application.Products] from Freudenberg Process Seals, available at www.freudenberg-process-seals.com).

It is the object of the present invention to propose an alternative ring seal to the above-described sheathed ring seals, which is usable in the fields of application mentioned.

This object is achieved by a ring seal having the features of claim 1. Advantageous developments and configurations of the invention are specified in claims dependent thereon.

Accordingly, the ring seal comprises an annular elastomeric core and a sheathing enclosing the core, said sheathing having at least one film made of fluoropolymer, preferably of polytetrafluoroethylene. The peripheral regions of the film are connected together such that the core is sealed off from the surroundings, i.e. the sheathing protects the elastomeric core against the penetration of the medium to be sealed off. In the simplest case, the peripheral regions are adhesively bonded together, but are preferably welded together. Thus, unlike in the case of O-rings seamlessly sheathed with FEP or PFA, there are one or more seam lines. Preferably, the sheathing is not connected to the core.

As far as can be seen, previous attempts to sheathe the elastic core in a sealing manner with a film of PTFE were aimed at connecting the PTFE film to the elastomeric core in some way. It has now been found that a ring seal in which only the peripheral regions of the film wrapping the core are connected together results in reliable insulation of the elastomeric core from the environment and at the same time in a ring seal with excellent properties. When the sheathing is not connected to the core, increased stresses within the ring seal as temperatures change, said increased stresses otherwise occurring on account of the different coefficients of thermal expansion of the elastomeric core on the one hand and the wrapping film on the other hand, are minimized.

Preferably, the sheathing is manufactured from two films, and the peripheral regions of one film are connected to the peripheral regions of the other film in a sealing manner, so as to result in two annular seam lines. From a manufacturing point of view this has proved to be advantageous compared with the use of only one film, in particular with regard to the avoidance of wrinkling.

In order to avoid wrinkling, it is particularly preferred for the film to be provided as a preformed annular shell, and thus, in the preferred embodiment, in the form of two half shells. On account of the preforming, the shell is dimensionally stable and the annular elastomeric core can be inserted relatively easily into the shell, before the peripheral regions of the shell (or shells) are connected together.

Provided that the sheathing is formed from two films or shells, these are preferably dimensioned such that the seam lines that result when the peripheral regions are connected extend on mutually diametrically opposite sides of the ring seal. On account of this symmetry, stresses which are induced in the ring seal during the production of the sheathing largely cancel one another out. Depending on the application, the two seam lines can be advantageously arranged for example at an equal spacing (at 12 o'clock and 6 o'clock), at a 45° angle (at 4:30 and 10:30 or 7:30 and 1:30) or concentrically in a plane (at 3 o'clock and 9 o'clock) with respect to the central axis of the ring seal. However, the seam lines can also, if required, be arranged in an offset manner. The PTFE-sheathed ring seals are used preferably for static seals, in particular for axial seals. For this case, it is generally advantageous to provide the seam lines in a concentric manner, specifically radially on the inside and radially on the outside of the elastomeric core.

While it is possible in principle to join the peripheral regions of the film edge to edge and to connect them together in a sealing manner in the region of the butt joint, for example by way of a butt weld, a preferred embodiment of the invention provides for the peripheral regions to overlap one another and for the connection to take place in the overlapping region. If the sheathing is produced from two preformed shells, each of the two shells then surrounds somewhat more than half of the core cross section, such that the peripheral regions of the two shells accordingly overlap.

There are no restrictions with regard to the material for the elastomeric core, but rather all materials, forms, cross-sectional geometries and sizes that are known to a person skilled in the art can be used.

The fluoropolymer from which the wrapping film is manufactured, preferably consists, as mentioned, of polytetrafluoroethylene (PTFE). PTFE is distinguished by good resistance to chemicals and a large temperature application range from close to −273° C. to 260° C. Preferably, use is made of oriented polytetrafluoroethylene (ePTFE), in particular biaxially oriented ePTFE, which has additionally been compressed. Since oriented PTFE is porous, the compressed ePTFE is used as a film material which is extremely dense and is producible with very small layer thicknesses. Rather than PTFE, the fluoropolymer film can consist of a thermoplastic fluoropolymer, in particular of FEP or PFA.

Preferably, the peripheral regions of the film are connected together without a separate adhesive being used. This is readily possible in the case of a thermoplastic fluoropolymer film by local melting. In the case of a PTFE film, the latter is preferably coated beforehand with a thermoplastic material. The coated film then preferably has an overall thickness in the range from only 15 to 100 μm; the thicker the annular core, the thicker the film. The film and the coating have more or less identical thicknesses in this case. However, the film should be selected to be as thin as possible, because the Shore hardness of the thickness increases correspondingly with increasing film thickness. As a result of the coating being melted in the peripheral regions that are to be connected together, the peripheral regions, i.e. the thermoplastic coating of the peripheral regions, enter into a mutual cohesive connection which is stable and impermeable once the thermoplastic material has cooled and has accordingly passed into the solid phase. Suitable materials for the thermoplastic coating are preferably fluorothermoplastics, in particular tetrafluoroethylene-hexafluoropropylene (FEP), perfluoroalkoxy alkane (PFA) or tetrafluoroethylene-hexafluoropropylene-vinylidene fluoride (TFP; also known as THV® from Dyneon). Preferably, the film is laminated with this thermoplastic coating material. A particularly advantageous, adhesive-free lamination of PTFE with such a thermoplastic material is described in WO 2005/105434 A2. To this end, the PTFE film is heated to a temperature above the crystalline melting temperature of PTFE, particularly above 370° C., and a film of the thermoplastic coating material is laminated onto the PTFE film at this temperature. Depending on the application, it may be advantageous to coat the PTFE film on both sides with the fluorothermoplastic.

It is in many cases sufficient, and preferable for cost reasons, for the film to be thermoplastically coated on only one side. If the sheathing is formed from two films or preformed shells, the coating material is preferably located on the inner side of one film or shell and preferably on the outer side of the other film or shell, such that the peripheral regions of the films or shells having the respective coating materials can be overlapped without one peripheral region having to be folded over or other measures having to be taken.

Accordingly, the peripheral regions are connected thermally by local melting of the thermoplastic coating in the seam region. In order, during the corresponding heating operation, to concentrate the required energy input on the thermoplastic coating, an advantageous development of the invention provides for the thermoplastic coating material of at least one film to be provided with suitable additives. For example, an additive which can be heated inductively, that is to say in a noncontact manner, can be selected. In this case, when two or more films or shells are used, the coating material of all the films or shells can be provided with corresponding additives. Other welding methods, as the case may be with or without suitable additives, are resistance welding, welding by means of hot air, laser welding and the like.

Therefore, the use of what are known as laser additives is particularly preferred. These are additives which absorb radiation of one or more wavelengths or wavelength regions. The additives are selected such that they absorb that radiation to which the sheathing, that is to say in particular the PTFE film, is transparent. Then, it is possible to specifically melt only the thermoplastic material, i.e. in particular the thermoplastic coating material, located behind the film, through the film, by way of the laser transmission method, as it is known, with laser radiation of a suitable wavelength. Suitable additives are for example pigments, in particular carbon black particles. Since different thermoplastics have different absorption properties, and since, furthermore, different lasers (diode laser, $CO_2$ laser, etc.) emit laser radiation at different wavelengths, given a suitable combination of laser, on the one hand, and materials of the sheathing, on the other, it is also possible, if necessary, to dispense with the addition of special laser additives. For laser transmission welding, it is sufficient, when for example two films are used, for only the coating material of one of the films to contain laser additives, because the heat of fusion of the melted coating material of the peripheral region of one film also melts the coating material of the opposite peripheral region of the other film. However, other laser welding methods are also usable for connecting the peripheral regions, for example laser butt welding, if the peripheral regions of the wrapping are located edge to edge and a butt weld is produced by means of laser.

It is particularly preferred for the film to be configured as a preformed shell which is polygonal in cross section and follows the outer contour of the elastomer ring in a flush manner. Since the elastomeric core material usually expands to a greater extent than the fluoropolymer sheathing in the event of a temperature increase, it can expand within the polygonal shell. In the process, the shell and core increasingly take on a circular cross section. In this connection, it is again advantageous for the sheathing not to be connected to the elastomeric core. It is particularly preferred for the transitions between the side faces of the polygon to be rounded, and in particular not angular, at least on the inner side facing the elastomeric core. The elastomeric core accordingly has analogous forms in its corner regions. It bears closely against the sheathing. Stresses which the expanding elastomeric core exerts, in the event of a temperature increase, on the wrapping are kept low as a result, in particular in the transition region between the polygon surfaces of the shell.

The invention furthermore relates to a method for producing the above-described ring seal.

The invention is explained by way of example in the following text with reference to the accompanying drawings, in which:

FIG. 1 shows a plan view of an O-ring according to a first exemplary embodiment

Figure 2:
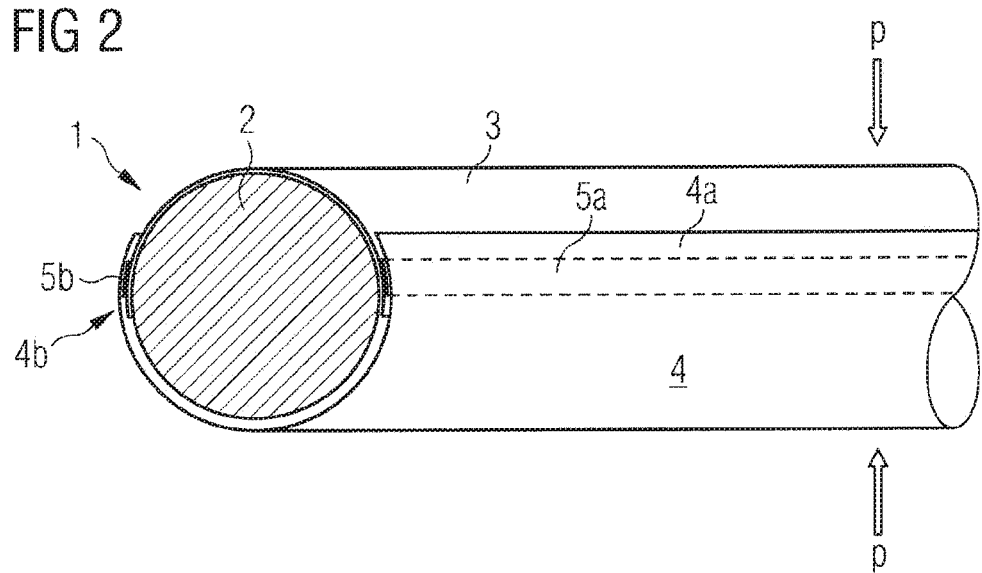
Figure 3:
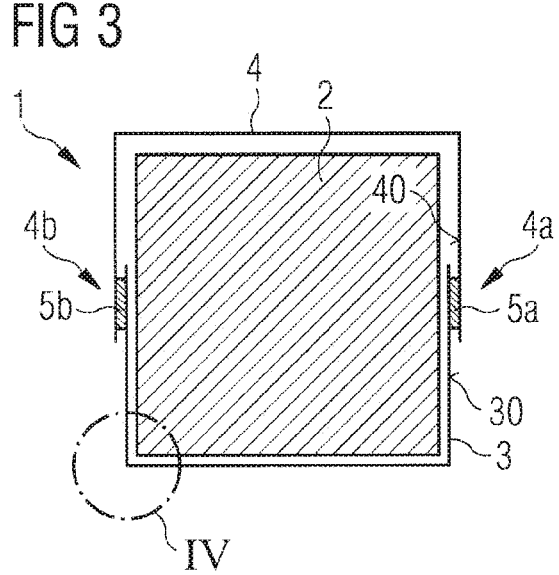
Figure 4:
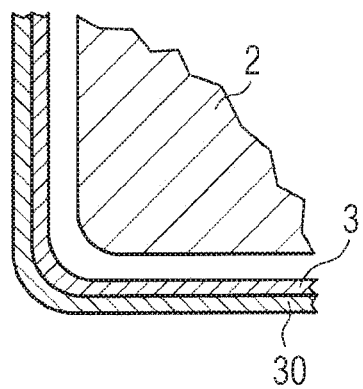
Figure 5A:
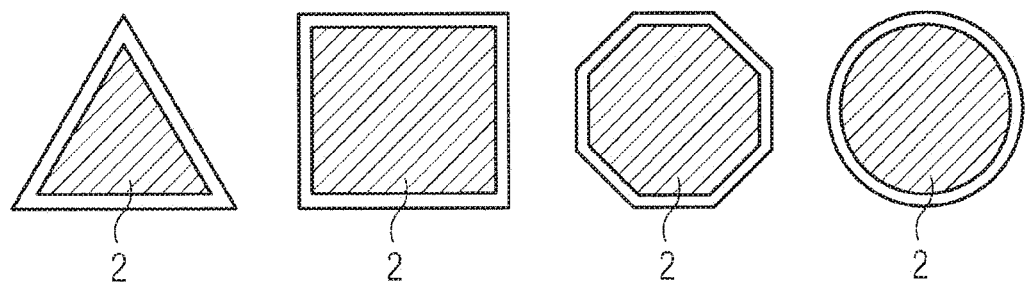
Figure 5B:
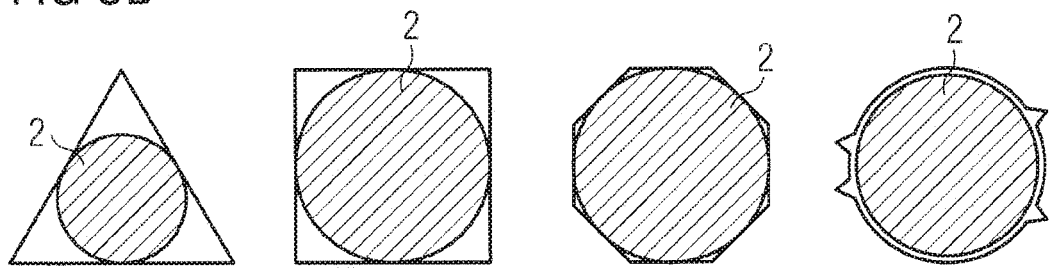
Figure 6A:
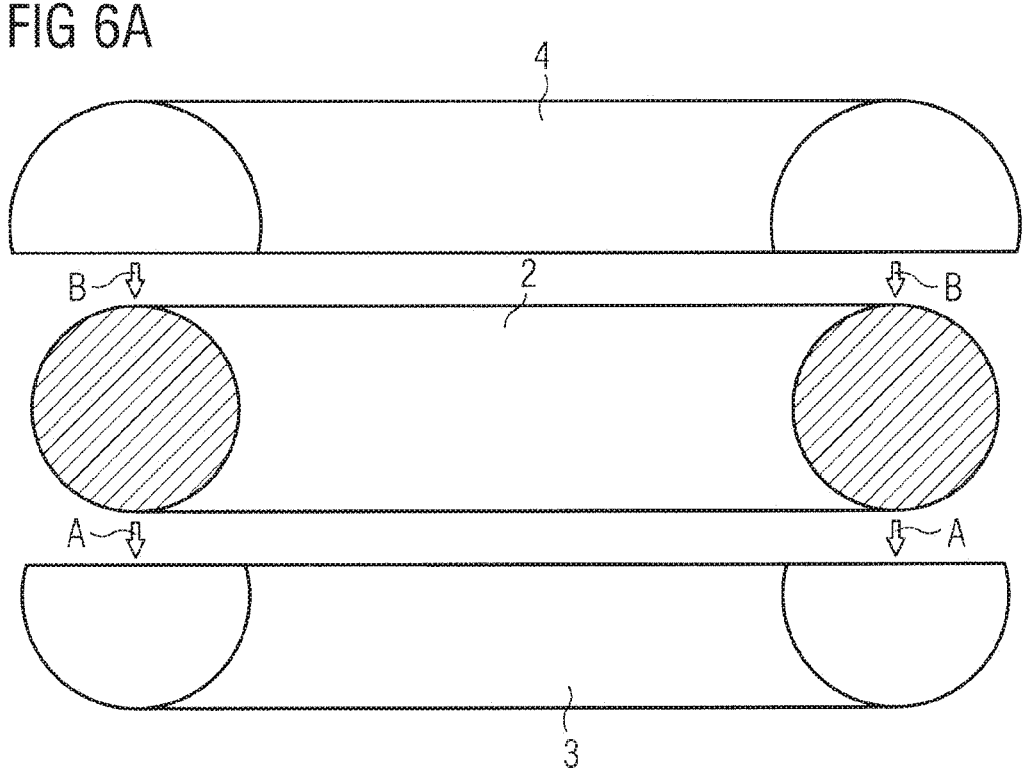
Figure 6B:
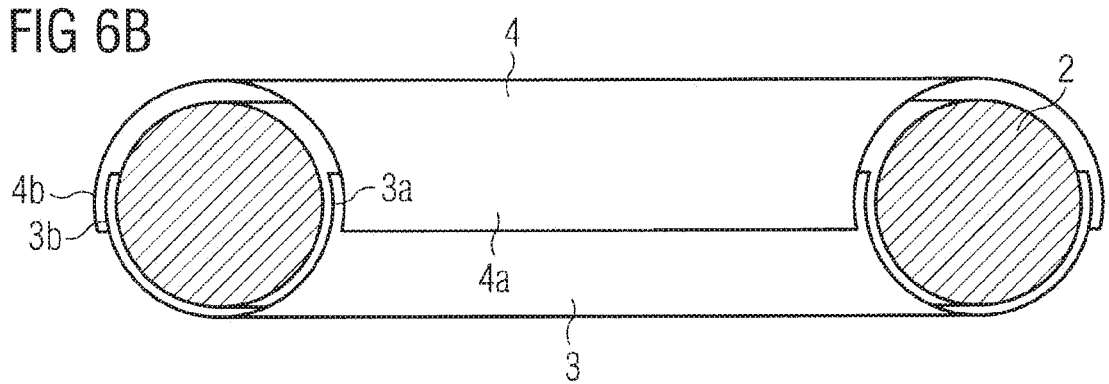
Figure 6C:
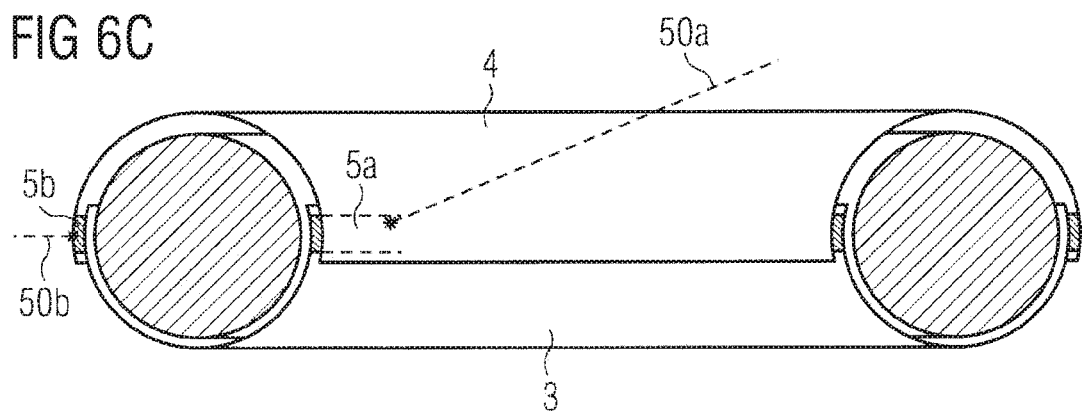

FIG. 2 shows an axial cross section through the O-ring from FIG. 1 in an enlarged illustration, FIG. 3 shows the cross section of an O-ring according to a second exemplary embodiment, FIG. 4 shows an enlarged illustration of a corner region of the cross section from FIG. 3, FIGS. 5A and 5B show different variants of O-ring cross sections, FIGS. 6A to 6C show successive steps in the production of the O-ring from FIGS. 1 and 2.

FIG. 1 shows a plan view of an O-ring 1 according to a first exemplary embodiment. FIG. 2 shows a cross section on the section line II-II through the O-ring 1 from FIG. 1 in an enlarged illustration. The O-ring 1 consists substantially of an annular elastomeric core 2 which is wrapped with a first film 3 and a second film 4, which together form the sheathing of the core 2. The elastomeric core can be round in cross section or have a wide variety of other cross-sectional geometries. The outer film 4 in this case overlaps, with its peripheral regions 4a and 4b, the corresponding peripheral region of the inner wrap 3. In the overlapping region, the two films 3, 4 are connected together in a sealing manner, for example adhesively bonded or preferably welded, along two seam lines 5a and 5b. The seam lines 5a and 5b accordingly extend all around the entire circumference of the O-ring. The ring is preferably used as an axial static sealing ring which is accordingly subjected to compressive forces from above and below in the arrow direction p. This application is less liable to wrinkling of the film 4 when in use. The seals described here are, however, also usable in principle as dynamic seals, for example with other seam positions as a piston seal or rod seal.

A suitable material for the core 2 is any suitable elastomer material. A fluoropolymer, for example a thermoplastic fluoropolymer or preferably polytetrafluoroethylene (PTFE) in one or another form is preferably selected as the material of the films 3 and 4 for the sheathing of the core 2. Oriented, in particular biaxially oriented, and compressed PTFE is particularly preferred. The production of compressed ePTFE is described for example in U.S. Pat. No. 5,374,473 (Knocks et al.). Compressed, biaxially oriented PTFE films, as described in WO 2005/105434 A1, in particular in accordance with the exemplary embodiments described therein, have proven to be particularly suitable. Reference is explicitly made to the content of WO 2005/105434 A1 in this respect. In order to be able to weld these films together in the overlapping region by the action of heat along the seam lines 5a and 5b, they can be provided with a thermoplastic coating, in particularly laminated, as is likewise described for example in WO 2005/105434, using a PFA coating film ("example 2"). Reference is explicitly made to the disclosure therein in this respect, too.

FIG. 3 relates to an O-ring according to a second embodiment exemplary, which differs from the first exemplary embodiment in particular by way of its cross-sectional shape, which is rectangular, in particular square. Accordingly, merely the ring cross section is schematically illustrated in FIG. 3. The ring 1 again comprises an elastomeric core 2 and two films 3 and 4, wrapping the core 2, which form an impermeable sheathing around the core 2. In contrast to the schematic illustration, it is actually preferred for the sheathing to bear closely against the core. In the overlapping regions, in which the film 4 overlaps, by way of its peripheral regions 4a and 4b, the corresponding peripheral regions of the film 3, the films are connected together in a sealing and circumferential manner along the seam lines 5a, 5b. The reference signs 30 and 40 indicate that the films 3 and 4 are provided on their mutually facing surfaces with a thermoplastic coating 30 and 40, respectively. In the case of the film 3, the coating 30 is located on the outside, and in the case of the film 4, the coating 4 is located on the inside, such that the coatings 30, 40 rest against one another in the overlapping region. The film is preferably PTFE and the thermoplastic coatings are preferably FEP, PFA or TFP. The coatings 30 and 40 are welded together along the seam lines 5a, 5b.

The films 3 and 4 in the exemplary embodiments according to FIGS. 2 and 3 are provided as preformed and accordingly relatively dimensionally stable shells, which are for their part producible by thermoforming corresponding films under the action of heat and subsequently cutting them to size. The elastomeric core 2 and the shell-like films have the same cross-sectional shape. Other polygonal cross sections are also possible, for example triangular, hexagonal or octagonal cross sections. Shells having a polygonal or oval cross section afford the advantage, compared with shells having a circular cross section, that they can deform to a circular cross section in the event of disproportionate thermal expansion of the core and thus can provide space for the increased volume of the court. Stresses in the sheathing are kept low as a result. In the case of polygonal cross sections of the shells forming the sheathing, it is advantageous for the transitions between the polygon surfaces, at least on that side of the shell or film 3 that faces the elastomeric core 2, and for the core 2 itself, to be rounded. This is illustrated in somewhat more detail in FIG. 4. The core 2 is rounded in a corresponding manner. In this way, stresses, which arise in the event of an increase in temperature on account of the more extensively expanding elastomeric core 2 with respect to the less extensively expanding sheathing material 3, 30, can be kept low. If the core 2 is not connected to the sheathing, the mutually adjoining surfaces slide along one another during the thermal expansion process. The stress compensation as a result of the selected geometries takes effect particularly at high use temperatures, for instance above 200° C. A suitable material combination for such high temperatures is for example a core made of high-temperature resistant silicone with a PTFE sheathing having a PFA coating.

However, the contour of the elastomeric core does not, as shown in FIG. 5A, necessarily have to match the contour of the shell. FIG. 5B shows a number of variants in which the elastomeric core 2 has a different cross-sectional shape than the polygonal sheathing. For example, the core can have a conventionally circular cross section while the sheathing is triangular, square, hexagonal or polygonal in some other way. Alternatively, the shell can have wrinkles. In the case of thermal expansion of the core 2, the latter can expand in the sheathing and fill free spaces, with the result that stresses in the sheathing are again kept low. With increasing expansion of the core 2, the sheathing then takes on an increasingly circular cross section.

FIG. 6 shows the three essential phases during the production of the ring seal 1. First of all, the elastomeric core 2 and two preformed, annular shells are provided. In a first step A, the core 2 is introduced into the lower shell 3, and in a second step B, the upper shell 4 is fitted over the core 2 such that the shells 3 and 4 wrap the core 2. As shown in FIG. 6B, the peripheral regions 3a, 3b of the lower shell 3 overlap the peripheral regions 4a, 4b of the upper shell 4 at the level of the meridian of the core 2. In the following step C, the shells 3 and 4 are welded together along their overlapping region by the laser transmission welding method. In the process, two seam lines 5a and 5b, which ultimately form a completely closed and impermeable circular seam, are produced. The material of the film 4 is transparent to the selected laser radiation 50a and 50b, and the thermoplastic coatings of the films 3 and 4 either absorb this radiation naturally or as a result of being correspondingly doped with additives. It is sufficient for the coating of the film 3 to absorb this radiation because, as a result of heat conduction, thermal energy is transferred to the correspondingly adjacent thermoplastic coating of the other film.

The invention claimed is:

1. A ring seal comprising:
   an annular elastomeric core; and
   a sheathing enclosing the core,
      wherein the sheathing comprises:
         a first fluoropolymer film,
            wherein the first fluoropolymer film comprises:
               a first peripheral region; and
               a second peripheral region;
         a second fluoropolymer film;
            wherein the second fluoropolymer film comprises:
               a first peripheral region; and
               a second peripheral region;
      wherein the first and second peripheral regions of the first and second fluoropolymer films are connected together;
      wherein the first peripheral region of the first fluoropolymer film overlaps with the first peripheral region of the second fluoropolymer film to define a first seam line;
      wherein the second peripheral region of the first fluoropolymer film overlaps with the second peripheral region of the second fluoropolymer film to define a second seam line;
         wherein the first and second seam lines extend on mutually diametrically opposite sides of the annular seal.

2. The ring seal as claimed in claim 1, wherein the sheathing is not connected to the core.

3. The ring seal as claimed in claim 1, wherein one of the two seam lines extends radially on the inside and the other of the two seam lines extends radially on the outside.

4. The ring seal as claimed in claim 1, wherein at least one of: the first fluoropolymer film, the second fluoropolymer film, or any combination thereof comprises polytetrafluoroethylene (PTFE).

5. The ring seal as claimed in claim 1, wherein at least one of: the first fluoropolymer film, the second fluoropolymer film, or any combination thereof comprises a coating material.

6. The ring seal as claimed in claim 5, wherein the coating material is a thermoplastic.

7. The ring seal as claimed in claim 5, wherein the coating material is a thermoplastic fluoropolymer, FEP, PFA or TFP.

8. The ring seal as claimed in claim 5, wherein the coating material is provided only on one side of the first fluoropolymer film, the second fluoropolymer film, or any combination thereof.

9. The ring seal as claimed in claim 5, wherein the first and second peripheral regions overlap one another such that the coating material is in mutual contact in the first and second overlapping regions.

10. The ring seal as claimed in claim 5, wherein the coating material of at least one of the first and second fluoropolymer films comprising an additive which promotes noncontact melting of the thermoplastic coating.

11. The ring seal as claimed in claim 10, the wherein the additive is configured to absorb radiation to which the sheathing is otherwise transparent.

12. The ring seal as claimed in claim 1, wherein the sealing connection of the first and second peripheral regions is a welded connection.

13. The ring seal as claimed in claim 1, wherein the at least one film is configured as a dimensionally stable, annular shell.

14. The ring seal as claimed in claim 13, wherein the shell is polygonal in cross section.

15. The ring seal as claimed in claim 14, wherein the shell transitions between polygonal surfaces that are rounded at least on a side of the shell that faces the elastomeric core.

16. A method comprising:
   obtaining an elastomer ring,
   obtaining:
      a first fluoropolymer film
         wherein the first fluoropolymer film comprises:
            a first peripheral region; and
            a second peripheral region;
      a second fluoropolymer film;
         wherein the second fluoropolymer film comprises
            a first peripheral region; and
            a second peripheral region;
   sheathing the elastomer ring with the film, and
   connecting, without establishing a connection of the sheathing to the elastomer ring, the first and second fluoropolymer films such that:
      the first peripheral region of the first fluoropolymer film overlaps with the first peripheral region of the second fluoropolymer film to define a first seam line; and
      the second peripheral region of the first fluoropolymer film overlaps with the second peripheral region of the second fluoropolymer film to define a second seam line;
         wherein the first and second seam lines extend on mutually diametrically opposite sides of the annular seal.

17. The method as claimed in claim 16 wherein at least one of the first fluoropolymer film and the second fluoropolymer film are obtained as two annular shells comprising compressed, oriented polytetrafluoroethylene (PTFE),
   wherein a first annular shell is coated at least on an inner side and the second annular shell is coated at least on an outer side with thermoplastic material,
   wherein the thermoplastic coatings of the first and second annular shells are in mutual contact, and
   wherein the first and second peripheral regions of the first and second fluoropolymer films are connected by a laser transmission welding method.

18. The ring seal as claimed in claim 1, the film comprising compressed, oriented polytetrafluoroethylene (PTFE).

19. The ring seal as claimed in claim 1, wherein the first fluoropolymer film, the second fluoropolymer film or any combination thereof is laminated with thermoplastic material.

20. The ring seal as claimed in claim 1, wherein the film is laminated in an adhesive-free manner with thermoplastic material.

21. The ring seal as claimed in claim 12, wherein the welded connection is a laser welded connection.

\* \* \* \* \*